(12) United States Patent
Tsunoda

(10) Patent No.: US 11,550,873 B2
(45) Date of Patent: Jan. 10, 2023

(54) ARITHMETIC PROCESSING APPARATUS, ARITHMETIC PROCESSING METHOD, AND NON-TRANSITORY COMPUTER-READABLE STORAGE MEDIUM FOR STORING ARITHMETIC PROCESSING PROGRAM

(71) Applicant: FUJITSU LIMITED, Kawasaki (JP)

(72) Inventor: Yukito Tsunoda, Sagamihara (JP)

(73) Assignee: FUJITSU LIMITED, Kawasaki (JP)

(*) Notice: Subject to any disclaimer, the term of this patent is extended or adjusted under 35 U.S.C. 154(b) by 398 days.

(21) Appl. No.: 16/831,889

(22) Filed: Mar. 27, 2020

(65) Prior Publication Data

US 2020/0356622 A1 Nov. 12, 2020

(30) Foreign Application Priority Data

May 9, 2019 (JP) .............................. JP2019-089094

(51) Int. Cl.
*G06F 16/00* (2019.01)
*G16B 5/00* (2019.01)
(Continued)

(52) U.S. Cl.
CPC .............. *G06F 17/17* (2013.01); *G06F 17/11* (2013.01); *G06N 3/126* (2013.01)

(58) Field of Classification Search
CPC .......... G06F 17/17; G06F 17/11; G06F 7/544; G06N 3/126; G06N 3/086; G06N 3/0454; G06N 3/08; G06K 9/6256
See application file for complete search history.

(56) References Cited

U.S. PATENT DOCUMENTS

2005/0209982 A1 9/2005 Jin et al.
2010/0191530 A1* 7/2010 Nakano ................... G10L 15/32
704/244

(Continued)

FOREIGN PATENT DOCUMENTS

JP 2001-109732 A 4/2001
JP 2001-134628 A 5/2001

OTHER PUBLICATIONS

Extended European Search Report dated Sep. 25, 2020 for European Patent Application No. 20166701.1, 10 pages.
(Continued)

*Primary Examiner* — Brandon S Cole
(74) *Attorney, Agent, or Firm* — Fujitsu Patent Center

(57) ABSTRACT

A method includes: generating a plurality of individuals of a current generation in accordance with a plurality of individuals of a previous generation to acquire values of an objective function for individuals each representing a variable by evolutionary computation; calculating, for each of partial individuals of the plurality of individuals of the current generation generated by the generating processing, a first value of the objective function by a predetermined method; approximately calculating, for each of the plurality of individuals of the current generation, a second value of the objective function with lower precision than the predetermined method; computing a fitness difference representing a difference between the plurality of individuals of the current generation in accordance with the first value or the second value; and controlling the precision of the approximate calculation based on the fitness difference and a precision difference between the first value and the second value.

13 Claims, 12 Drawing Sheets

(51) Int. Cl.
  *G06V 20/58*   (2022.01)
  *G06N 20/00*   (2019.01)
  *G06F 17/17*   (2006.01)
  *G06F 17/11*   (2006.01)
  *G06N 3/12*    (2006.01)

(56) References Cited

U.S. PATENT DOCUMENTS

2014/0221216 A1* 8/2014 Cope .................... G16B 5/20
                                                  506/1
2016/0224803 A1* 8/2016 Frank ................ G06F 21/6245
2016/0300252 A1* 10/2016 Frank ............... G06F 16/24578
2017/0124576 A1* 5/2017 Lagoni .................... H04L 67/02

OTHER PUBLICATIONS

European Office Action dated Jul. 5, 2022 for corresponding European Patent Application No. 20166701.1, 6 pages. \*\*\*Please note US-2005/0209982-A1 cited herewith, was previously cited in an IDS filed on Dec. 1, 2020.\*\*\*

\* cited by examiner d1:d2=1:1 d3:d4=2:1

ARITHMETIC PROCESSING APPARATUS, ARITHMETIC PROCESSING METHOD, AND NON-TRANSITORY COMPUTER-READABLE STORAGE MEDIUM FOR STORING ARITHMETIC PROCESSING PROGRAM

CROSS-REFERENCE TO RELATED APPLICATION

This application is based upon and claims the benefit of priority of the prior Japanese Patent Application No. 2019-89094, filed on May 9, 2019, the entire contents of which are incorporated herein by reference.

FIELD

The embodiments discussed herein are related to an arithmetic processing apparatus, an arithmetic processing method, a non-transitory computer-readable storage medium storing an arithmetic processing program.

BACKGROUND

In the past, an approximate value output device has been known that outputs a value approximate to a true value depending on a combination of input data. The approximate value output device has a cerebellar model including a plurality of layer models each having a granular cell value for each combination of sections acquired by dividing a possible range of a kind of data into a plurality of parts. The approximate value output device has a calculating unit that identifies granular cell values of combinations of corresponding sections based on a plurality of kinds of input data, adds the granular cell values of the layers and calculates an approximate value. The division positions of the cerebellar model unit in the approximate value output device is defined to be proper with an evolutionary algorithm within a range of specified number of divisions.

An optimization design apparatus applying a genetic search method has been known that allows acquisition of an optimum solution by performing automatic calculation on a real design problem with an enormous number of design variable data. The optimization design apparatus includes an approximate optimization calculating device using an approximate expression of discrete design variable data such as dimensions of sections of a frame member and a detail optimization calculating device using the design variable data. These two calculating devices are coupled to configure the optimization design apparatus for a frame construction. The optimization design apparatus automatically and continuously executes optimization calculations in two stages by using the approximate optimization device and the detail optimization device using the approximate expression of the design variable data.

Examples of the related art include Japanese Laid-open Patent Publication No. 2001-109732 and Japanese Laid-open Patent Publication No. 2001-134628.

SUMMARY

According to an aspect of the embodiments, an arithmetic processing apparatus includes: a memory; and a processor coupled to the memory, the processor configured to: execute a generating processing that includes generating a plurality of individuals of a current generation in accordance with a plurality of individuals of a previous generation to acquire values of an objective function for individuals each representing a variable by evolutionary computation; execute a first calculating processing that includes calculating, for each of partial individuals of the plurality of individuals of the current generation generated by the generating processing, a first value of the objective function by a predetermined method; execute a second calculating processing that includes approximately calculating, for each of the plurality of individuals of the current generation generated by the generating processing, a second value of the objective function with lower precision than the predetermined method; execute a fitness difference computing processing that includes computing a fitness difference representing a difference between the plurality of individuals of the current generation in accordance with the first value of the objective function or the second value of the objective function; and execute a precision control processing that includes controlling the precision of the approximate calculation by the second calculating processing based on the fitness difference and a precision difference representing a difference between the first value of the objective function and the second value of the objective function, the controlling of the precision of the approximate calculation being configured to be performed such that as the fitness difference increases, the precision difference increases and as the fitness difference decreases, the precision difference decreases.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

In a case where optimization of a predetermined objective function is attempted by using evolutionary computation, generation of individuals indicating variables of the objective function is repeated. Because, in the evolutionary computation, a plurality of individuals is generated in each generation, values of objective functions corresponding to the individuals are to be calculated. Thus, the number of individuals generated by the evolutionary computation is enormous, and an enormous amount of time is taken for calculation of the objective functions.

Therefore, it may be considered to apply approximate calculation to the evolutionary computation. By applying approximate calculation to the evolutionary computation, the speed of the computing processing of the evolutionary computation may be increased. However, because approximate calculation has low precision of calculation, there is a problem that a proper calculation result may not be acquired.

According to one aspect, it is an object of the disclosed art to acquire a proper calculation result in a short period of time when evolutionary computation is used.

According to one aspect, the disclosed art has an advantage that a proper calculation result may be acquired in a short period of time when evolutionary computation is used.

The embodiments disclosed herein will be described in detail below with reference to the drawings.

<Arithmetic Processing Unit of First Embodiment>

Figure 1:
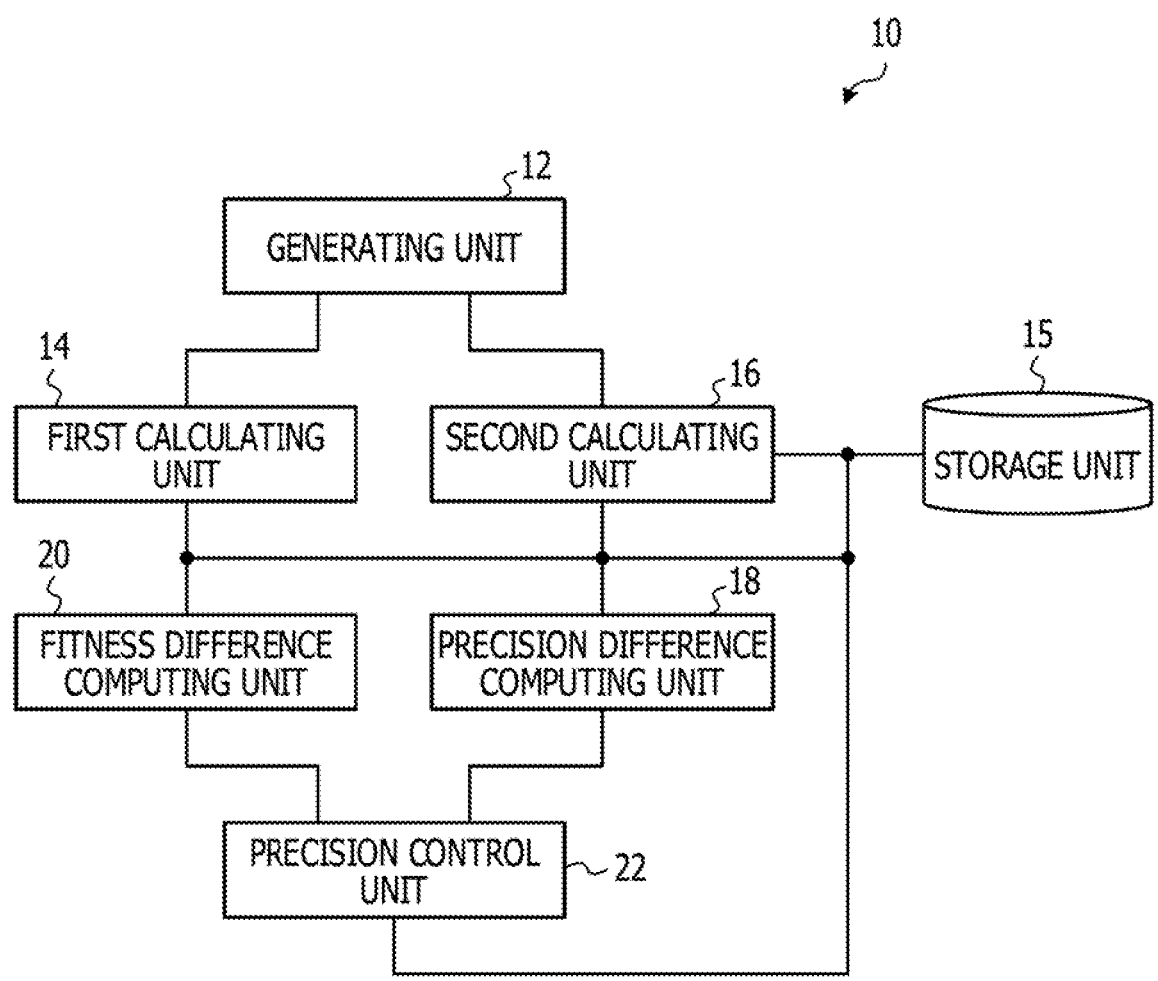
FIG. 1 is a schematic block diagram of an arithmetic processing unit according to a first embodiment.

As Illustrated in FIG. 1, an arithmetic processing unit 10 according to a first embodiment includes a generating unit 12, a first calculating unit 14, a storage unit 15, a second calculating unit 16, a precision difference computing unit 18, a fitness difference computing unit 20, and a precision control unit 22. The arithmetic processing unit 10 of this embodiment computes an optimum value of a predetermined objective function by using evolutionary computation.

In order to acquire values of an objective function for individuals each representing a variable by evolutionary computation, the generating unit 12 generates a plurality of individuals of a current generation based on each of a plurality of individuals of a previous generation. As an example of the evolutionary computation, a genetic algorithm has been known. The genetic algorithm is applicable to various objective functions.

Figure 2:
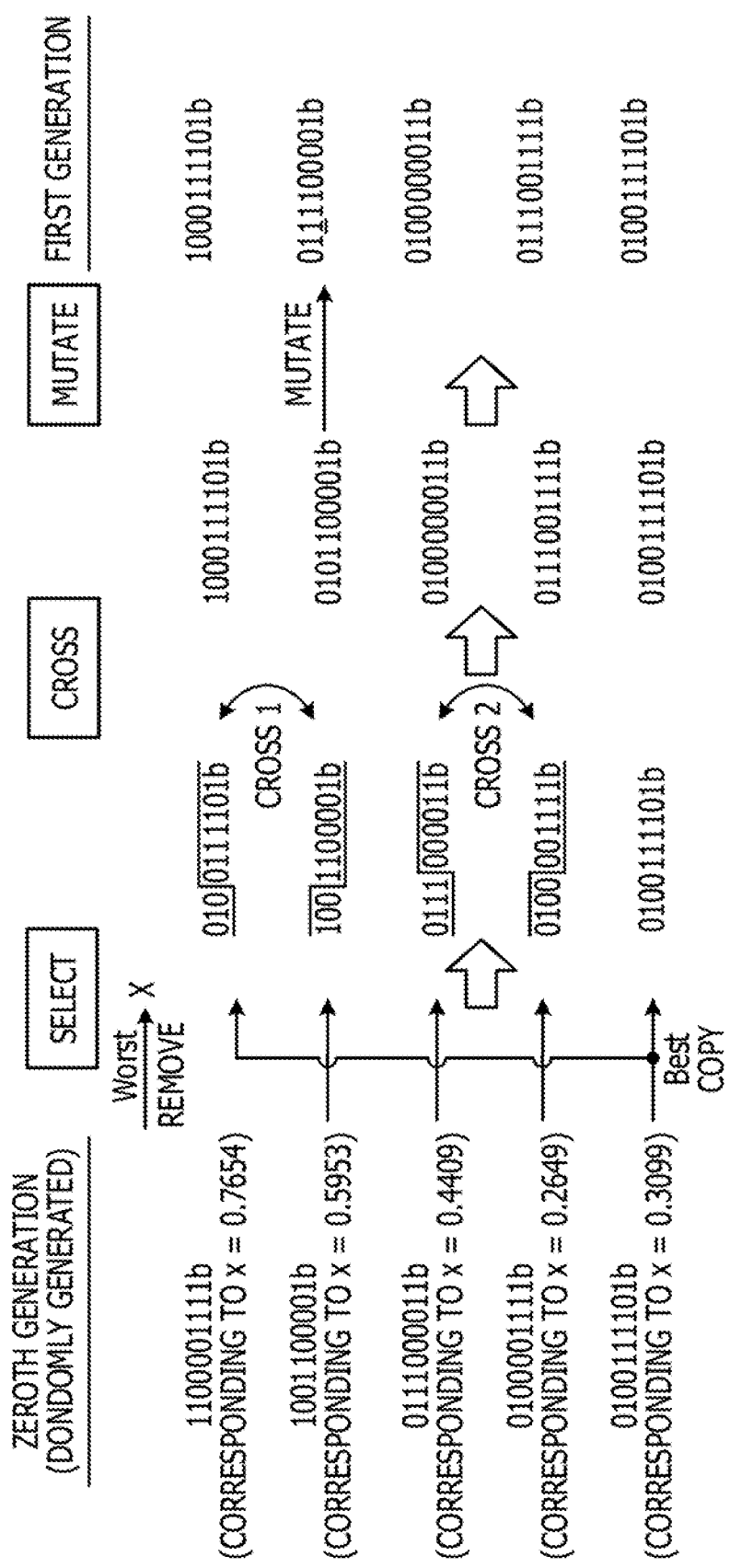
FIG. 2 is an explanatory diagram for explaining evolutionary computation.

FIG. 2 is an explanatory diagram for explaining the evolutionary computation. In the example in FIG. 2, each of numerical values corresponding to individuals is represented by a binary bit string. In FIG. 2, a numerical value x of 0 to 1 is written by a binary number.

In the evolutionary computation, a plurality of individuals is generated for each generation. Values of an objective function for the individuals are calculated. In this case, as illustrated in FIG. 2, a plurality of individuals of the current generation is generated by selection, crossing, and mutation of the plurality of individuals of the previous generation. When individuals of the current generation are generated, the plurality of individuals is ranked in accordance with values of the objective function (hereinafter, also called "fitness") for the plurality of individuals of the previous generation.

For example, as illustrated in FIG. 2. in a selection in the evolutionary computation, an individual "1100001111b" having a minimum ("Worst" in FIG. 2) value of the objective function is removed (where the individual x corresponds to x=0.7654). On the other hand, an individual "0100111101b" having a maximum ("Best" in FIG. 2) value of the objective function (where the individual x corresponds to x=0.3099) is copied as an individual of a first generation that is the current generation without crossing and mutation.

As illustrated in FIG. 2, in a crossing in the evolutionary computation, a crossing 1 is performed in which the higher 3 bits are exchanged between an individual "0100111101b" and an individual "1001100001b" to generate an individual "1000111101b" and an individual "0101100001b". A crossing 2 is performed in which higher 4 bits are exchanged between an individual "0111000011b" and an individual "0100001111b" to generate an individual "0100000011b" and an individual "0111001111b".

As Illustrated in FIG. 2, in a mutation in the evolutionary computation, the individual "0101100001b" is mutated to "0111100001b".

Figure 3:
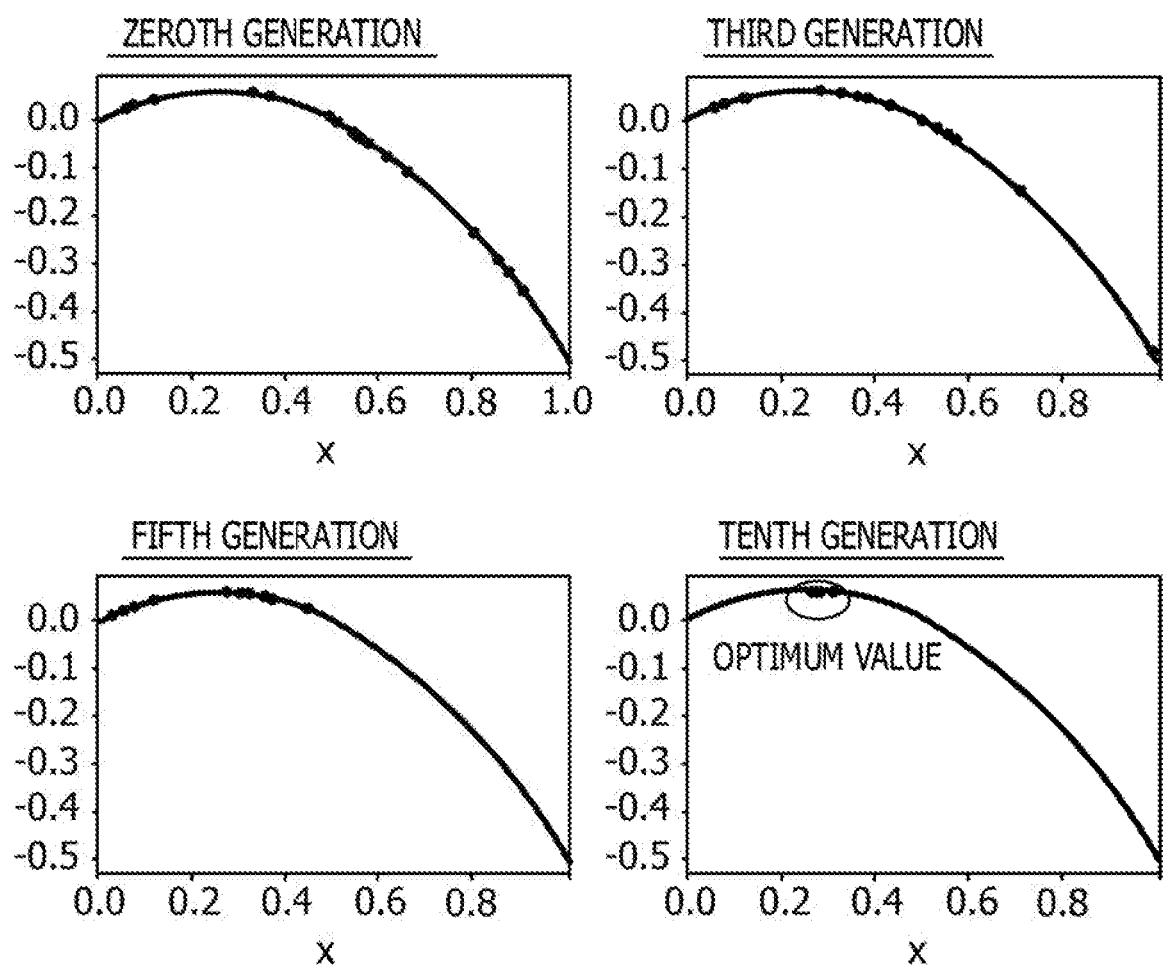
FIG. 3 is an explanatory diagram for explaining evolutionary computation.

In this manner, the individuals of the first generation that is the current generation are generated from the individuals of the zeroth generation that is the previous generation. When the generation advances by repeating the generation of the plurality of individuals, the plurality of individuals is caused to have values closer to optimum values of the objective function, and optimum values of the objective function are acquired finally (such as in the tenth generation) as illustrated in FIG. 3.

For each of partial individuals of the plurality of individuals of the current generation generated by the generating unit 12, the first calculating unit 14 calculates values of the objective function for the partial individuals by a predetermined method. The predetermined method for the calculation by the first calculating unit 14 is different from the calculation method in the second calculating unit 16, which will be described below. More specifically, for example, the precision of the calculation representing the degree of precision of the calculation by the first calculating unit 14 is higher than the precision of the calculation by the second calculating unit 16.

Therefore, when the calculation by the first calculating unit 14 with higher precision is performed on all of the plurality of individuals of the current generation generated by the generating unit 12, it takes an enormous amount of calculation time. Accordingly, in the arithmetic processing unit 10 of this embodiment, the first calculating unit 14 that performs calculation with higher precision (hereinafter, simply called "high-precision calculation") calculates values of the objective function for a part of the plurality of individuals of the current generation generated by the generating unit 12. On the other hand, as will be described below, the second calculating unit 16 that performs approximate calculation with lower precision than that of the first calculating unit 14 calculates values of the objective function of the individuals of all of the plurality of individuals of the current generation generated by the generating unit 12.

Figure 4:
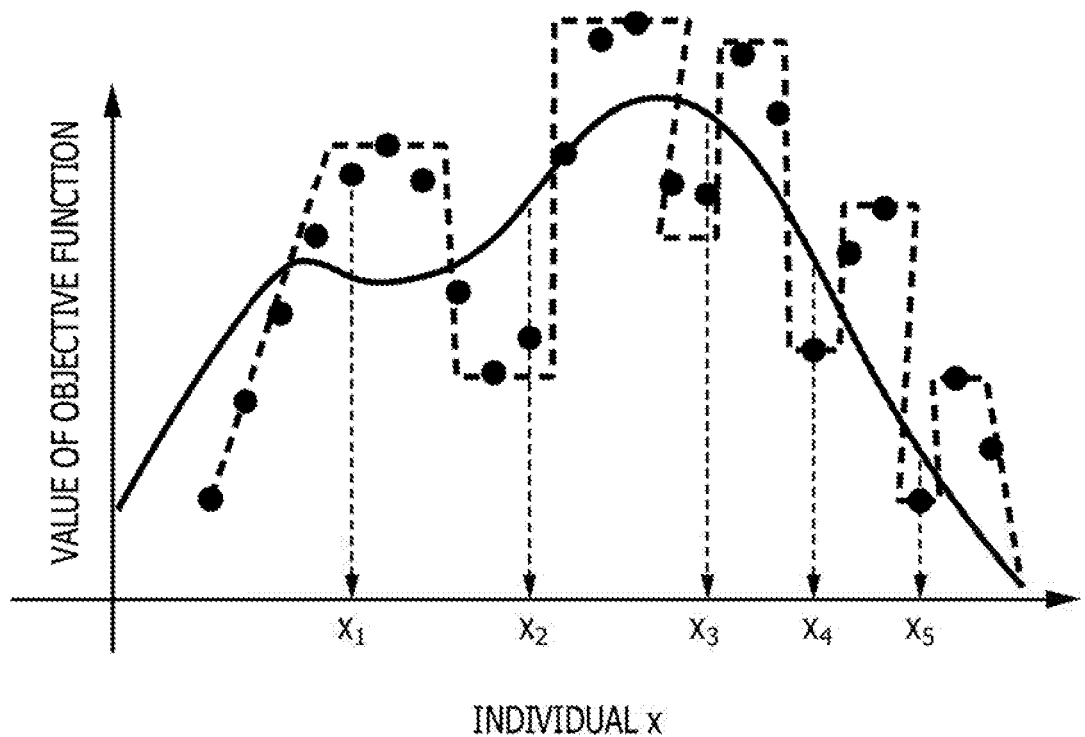
FIG. 4 is an explanatory diagram for explaining a relationship between values of an objective function calculated with high precision by a first calculating unit and values of the objective function approximately calculated by a second calculating unit.

FIG. 4 illustrates an explanatory diagram for explaining a relationship between values of an objective function calculated with high precision by the first calculating unit 14 and values of the objective function approximately calculated by the second calculating unit 16. Each of triangle symbols illustrated in FIG. 4 indicates a value of an objective function of each of partial individuals of the plurality of individuals of the current generation, which is calculated with high precision by the first calculating unit 14. Each of black circles illustrated in FIG. 4 indicates a value of the objective function of all individuals of the current generation, which is calculated with low precision by the second calculating unit 16. A value of the objective function of each ($x_1$, $x_2$, $x_3$, $x_4$, $x_5$, . . . ) of the partial individuals of the plurality of individuals of the current generation is used for computing a precision difference, which will be described below.

Because the approximate calculation by the second calculating unit 16 has a lower precision than the high-precision calculation by the first calculating unit 14, the calculation time is short. Thus, by approximately calculating values of the objective function for a plurality of individuals, the calculation time of the evolutionary computation may be reduced compared with a case where the values of the objective function are calculated only by the high-precision calculation. Therefore, the speed of the calculation processing using evolutionary computation may be increased.

The storage unit 15 stores a plurality of tables in which a value of an individual and a value of an objective function corresponding to the value of the individual are associated in advance. The plurality of tables stored in the storage unit 15 is used in approximate calculation in the second calculating unit 16, which will be described below.

Figure 5:
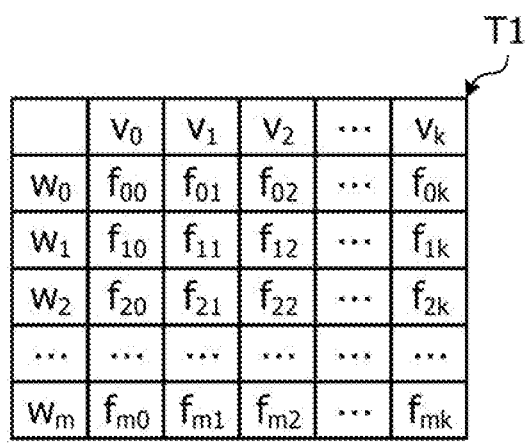
FIG. 5 is an explanatory diagram for explaining tables stored in a storage unit.
Figure 5:
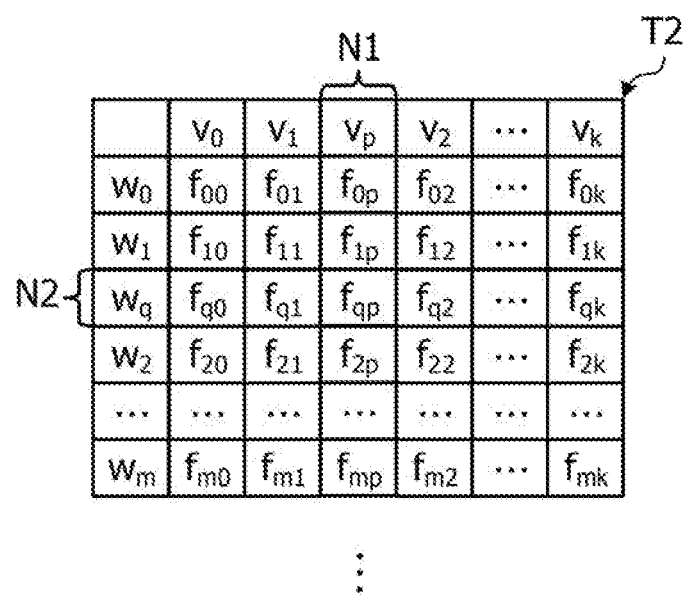

FIG. 5 illustrates an explanatory diagram for explaining tables stored in the storage unit 15. As illustrated in FIG. 5, each of the tables stores a value of a variable corresponding to an individual and a value of an objective function for the individual in association. FIG. 5 illustrates an example of a case where the variable representing an individual is a two-dimensional vector. A variable representing an individual is expressed by a two-dimensional vector of $x=(v_i, w_j)$, and a value of an objective function corresponding to the individual x is expressed by f(x) (such as $f_{00}$ in FIG. 5). Thus, a value of the objective function f(x) for each individual $x=(v_i, w_j)$ is associated with the tables. In this case, i=0, 1, 2, . . . , k, and j=0, 1, 2, . . . , m.

FIG. 5 illustrates a table T1 and a table T2, which are examples of the plurality of tables. Comparing between the table T1 and the table T2, the numbers of combinations of individuals and values of the objective function are different. When the table T1 and the table T2 are compared, the table T2 further has column data of N1 and row data of N2, which are new data. The plurality of tables including the table T1 and the table T2 is different in the numbers of data pieces to be registered therewith. A table with a higher number of data pieces registered therewith is used for executing an approximate calculation with higher precision.

Each value stored in the tables in the storage unit 15 is a value of the objective function f(x) calculated by the first calculating unit 14. Therefore, as preprocessing, for each of a plurality of variables, the first calculating unit 14 calculates a value of the objective function f(x) corresponding to the variable by a predetermined method and stores the values of the objective function f(x) in the plurality of tables. By using the variables and values of the objective function for the variables, which are stored in the tables, a value of the objective function for an individual is calculated. Because the plurality of tables is different from each other in the number of combinations of variables representing individuals and the values of the objective function for the variables, a table having a higher number of data pieces registered therewith is used for executing an approximate calculation with higher precision.

The second calculating unit 16 performs an approximate calculation with lower precision than that of the predetermined method by the first calculating unit 14 on a value of the objective function for an individual with respect to each of the individuals of the current generation including each of the partial individuals having undergone the calculation by the predetermined method by the first calculating unit 14.

Although there are various methods as a method for the approximate calculation, the second calculating unit 16 of the first embodiment approximately calculates values of the objective function for the individuals of the current generation by acquiring the values of the objective function with reference to the tables stored in the storage unit 15.

For example, the second calculating unit 16 approximately calculates a value of the objective function for an individual x=(v', w') of the current generation by interpolation of values stored in the tables in the storage unit 15 when the individual x=(v', w') of the current generation is generated by the generating unit 12.

For example, it is assumed that the element v' of a vector representing an individual of the current generation positions between $v_1$ and $v_2$ stored in the table T1 illustrated in FIG. 5 and that the element w' of the vector representing the individual positions between $w_0$ and $w_1$ stored in the table T1.

In this case, the elements v' and w' are expressed by the following expressions. d1 indicates a distance between v' and $v_1$, and d2 indicates a distance between v' and $v_2$. d3 indicates a distance between w' and $w_1$, and d4 indicates a distance between w' and $w_2$.

$$v'=(d2*v_1+d1*v_2)/(d1+d2)$$

$$w'=(d4*v_1+d3*v_2)/(d3+d4)$$

Figure 6:
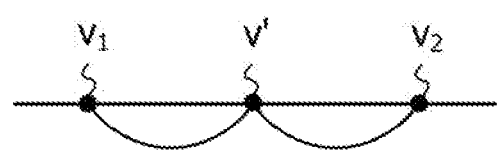
FIG. 6 is an explanatory diagram for explaining approximate calculation using tables.
Figure 6:
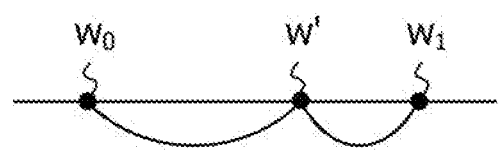

More specifically, for example, as illustrated in FIG. 6, the element v' positions at the middle of $v_1$ and $v_2$. On the other hand, as illustrated in FIG. 6, the ratio of the distance between the elements w' and $w_0$ and the distance between the elements w' and $w_1$ satisfies a relationship of 2:1.

In this case, the elements v' and w' are expressed by the following expressions.

$$v'=(v_1+v_2)/2$$

$$w'=(w_0+2*w_1)/3$$

In this case, the second calculating unit 16 calculates a value g(v', w') of the objective function for the individual x=(v', w') with reference to the table T1 in the storage unit 15 and by using the following expression.

$$g(v',w')=((f_{01}+f_{02})/2+2*(f_{11}+f_{12})/2)/3$$

In this manner, according to this embodiment, the calculation results of the approximate calculations by the second calculating unit 16 are used so that the speed of the calculation processing of the evolutionary computation may be increased. However, when approximate calculation is applied in the evolutionary computation, the precision of the approximate calculation is low. Therefore, the plurality of individuals generated by the generating unit 12 may not be properly ranked. When approximate calculation is applied to the evolutionary computation, the individuals may not reach their optimum values.

Figure 7:
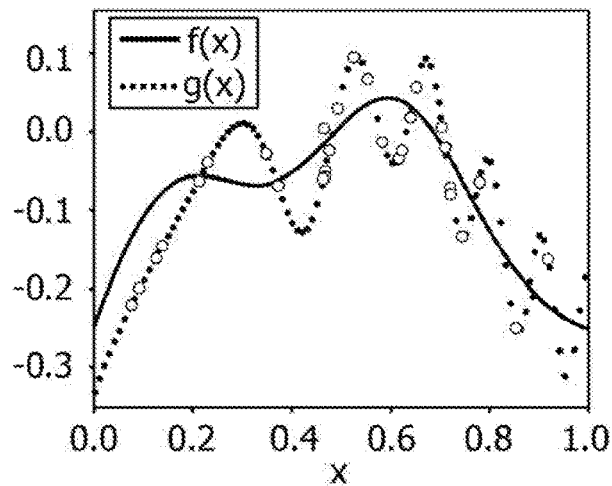
FIG. 7 is an explanatory diagram for explaining approximate calculation results.
Figure 7:
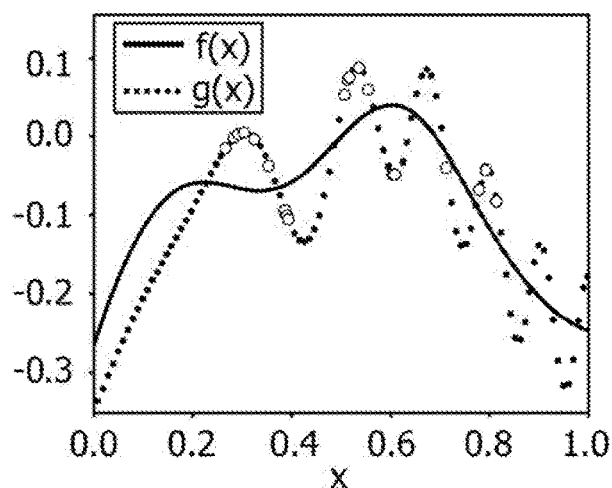
Figure 7:
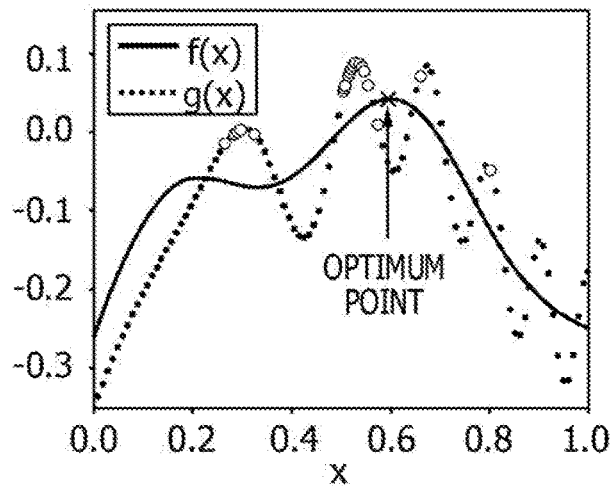

FIG. 7 illustrates an explanatory diagram for explaining approximate calculation results. The graphs illustrated in FIG. 7 are examples of simulation results in a case where approximate calculation is applied to the evolutionary computation. The solid lines illustrated in FIG. 7 are the objective function f(x) calculated by the high-precision calculation. The broken lines are an objective function g(x) calculated by approximate calculation. The values of the objective function g(x) by approximate calculation have a precision difference from the values of the objective function f(x) by the high-precision calculation. Each of white circles illustrated in FIG. 7 represents a value of the objective function for an individual, which is acquired by approximate calculation.

When individuals of the current generation are generated by the generating unit 12, the individuals of the previous generation are ranked in accordance with their fitnesses, and the generation of the individuals of the current generation is performed in accordance with the ranking result. However, because the precision of approximate calculation is low, the ranking of a plurality of individuals may not properly performed in accordance with the calculation results of the approximate calculation. For example, when a value $g(x_1)$ of the objective function for the individual $x_1$ and a value $g(x_2)$ of the objective function for the individual $x_2$ are identical values because of the approximate calculation, the ranking according to the fitnesses representing the values of the objective function may not be performed.

Against this, in a case where the variations of the values of the objective function for individuals by approximate calculation are large and where differences between the values of the objective function for the individuals are large as in the individuals of the zeroth generation illustrated in FIG. 7, the individuals may be ranked even though the calculation precision of the approximate calculation is low. On the other hand, like the individuals of the fifth generation illustrated in FIG. 7, in a case where variations of the values of the objective functions for individuals by the approximate calculation are small and where differences between the values of the objective function for the individuals are small, the values of the objective function for different individuals may be an identical value. Therefore, when differences between values of the objective function for individuals are small, the plurality of individuals may not sometimes be properly ranked.

Like the ninth generation illustrated in FIG. 7, in a case where the evolutionary computation is performed by using values of the objective function $g(x)$ being approximate calculation results for the individuals, the generated individuals fall into local solutions because of the roughness of the calculation results of the approximate calculation, and an optimum value may not sometimes be reached.

Accordingly, in this embodiment, the precision of the approximate calculation by the second calculating unit 16 is controlled in accordance with the difference between the high-precision calculation by the first calculating unit 14 and the approximate calculation by the second calculating unit 16 and the difference between values of the objective function for a plurality of individuals of the current generation. More specifically, for example, the arithmetic processing unit 10 of this embodiment controls the precision of the approximate calculation such that the values of the objective function for a plurality of newly generated individuals may be ranked when the evolutionary computation is performed.

This will be specifically described below.

The precision difference computing unit 18 computes a precision difference a indicating a difference between a value of the objective function calculated by a predetermined method by the first calculating unit 14 and a value of the objective function approximately calculated by the second calculating unit 16. The precision difference computing unit 18 of this embodiment computes, as the precision difference a, a maximum value of differences between values of the objective function calculated by a predetermined method by the first calculating unit 14 and values of the objective function approximately calculated by the second calculating unit 16.

More specifically, for example, the precision difference computing unit 18 computes, as the precision difference a, a maximum value of the differences between values of the objective function $f(x)$ acquired by the first calculating unit 14 and the values of the objective function $g(x)$ acquired by the second calculating unit 16 for an identical individual x.

For example, a case where values of the objective function are calculated by both of the first calculating unit 14 and the second calculating unit 16 for each of the partial individuals $(x_0, x_1, x_2, \ldots, x_k)$ of the plurality of individuals $(x_0, x_1, \ldots, x_n)$ of the current generation (where k<n) will be described as an example.

In this case, a maximum value among $|f(x_0)-g(x_0)|$, $|f(x_1)-g(x_1)|$, $|f(x_2)-g(x_2)|$, ..., $|f(x_k)-g(x_k)|$, which are absolute values of differences between values $f(x)$ of the objective function and the values $g(x)$ of the objective function, is computed as the precision difference a.

The fitness difference computing unit 20 computes a fitness difference b representing a difference between values of the objective function based on the values of the objective function for each of a plurality of individuals of the current generation. The fitness difference computing unit 20 of this embodiment computes, as a fitness difference b, a difference between the maximum value of the values of the objective function for each of the partial individuals, which are calculated by the first calculating unit 14, and a minimum value of the values of the objective function for each of the partial individuals. In a sense, the fitness difference b may be conceivable as a difference between the plurality of individuals of the current generation. More specifically, for example, a difference between the maximum value and the minimum value of the values of the objective function $f(x)$ calculated by the first calculating unit 14 is computed as the fitness difference b. The fitness difference is a value representing a degree of variation of values of the objective function calculated with high precision by the first calculating unit 14, and it is indicated that as the fitness difference increases, the range of the distribution of the values of the objective function for a plurality of individuals increases.

The precision control unit 22 controls the degree of precision of approximate calculation by the second calculating unit 16 (hereinafter, simply called "precision of approximate calculation") based on the precision difference a computed by the precision difference computing unit 18 and the fitness difference b computed by the fitness difference computing unit 20. More specifically, for example, the precision control unit 22 controls the precision of approximate calculation by the second calculating unit 16 such that as the fitness difference b increases, the precision difference a increases and as the fitness difference b decreases, the precision difference a decreases.

Because of the control of the precision of approximate calculation such that as the fitness difference b increases, the precision difference a increases and as the fitness difference b decreases, the precision difference a decreases, the ranking of a plurality of newly generated individuals of the current generation may be performed. Thus, the evolutionary computation may be properly executed.

When the fitness difference b is large, the variations of the fitnesses of the individuals are large in the evolutionary computation. Thus, ranking of the individuals is easy even if the precision of the approximate calculation is low. A low precision of approximate calculation corresponds to a large precision difference a. On the other hand, when the fitness difference b is small, the fitnesses of the individuals have similar values. Then, when the precision of the approximate calculation is low, the fitnesses of the individuals may not be precisely sectioned, and the ranking of the individuals is difficult. Thus, when the relationship between the precision difference a and the fitness difference b is properly controlled, the ranking of the individuals may be properly performed. As a result, the precision of the calculation results of the evolutionary computation may be maintained.

Accordingly, the precision control unit 22 of this embodiment increases the precision difference a as the fitness difference b increases and reduces the precision difference a as the fitness difference b decreases. Thus, the ranking of the plurality of individuals may be property performed. As illustrated in FIG. 7 described above, it is found that the objective function g(x) approximately calculated by the second calculating unit 16 is vertically distributed with respect to the objective function f(x) calculated with high precision by the first calculating unit 14. Therefore, when the value approximately twice as much as the precision difference a falls in the values of the fitness difference b, the ranking of the individuals may often be possible.

Accordingly, the precision control unit 22 of this embodiment controls the precision of the approximate calculation such that the relationship that the value 2a twice as much as the precision difference is equal to or lower than the fitness difference b (2a≤b) is maintained. When the relationship that the value 2a twice as much as the precision difference is equal to or lower than the fitness difference b (2a≤b) is maintained, the ranking of the individuals is possible. Thus, the precision of the calculation result of the evolutionary computation may be sufficiently maintained.

When the fitness difference b is large, the variations of the fitnesses of the individuals are large. Thus, ranking of the individuals is easy even if the precision of the approximate calculation is low. Therefore, the precision control unit 22 of this embodiment increases the precision difference a between the high precision calculation and the approximate calculation when the fitness difference b is large to reduce the precision of the approximate calculation. As a result, the reduction of the calculation time is attempted.

More specifically, for example, the precision control unit 22 keeps the precision of the approximate calculation by the second calculating unit 16 as it is when the relationship that the value 2a twice as much as the precision difference is equal to or lower than the fitness difference b (2a≤b) is maintained. On the other hand, the precision control unit 22 outputs, to the second calculating unit 16, a precision control signal that improves the precision of the approximate calculation when the relationship that the value 2a twice as much as the precision difference is equal to or lower than the fitness difference b (2a≤b) is not maintained.

When the second calculating unit 16 obtains the precision control signal from the precision control unit 22, the second calculating unit 16 performs approximate calculation with higher precision than the approximate calculation in the past. More specifically, for example, the second calculating unit 16 re-calculates values of the objective function for the plurality of individual of the current generation by using a table having more data pieces registered therewith than the table used for the approximate calculation in the past. Thus, approximate calculation with higher precision than the approximate calculation in the past is performed, and the precision difference a is reduced. Therefore, the relationship that the value 2a twice as much as the precision difference a is equal to or lower than the fitness difference b (2a≤b) is maintained.

When the precision difference a is equal to or lower than a preset threshold value, the precision control unit 22 outputs a stop control signal to stop the approximate calculation to the first calculating unit 14 and the second calculating unit 16.

When the first calculating unit 14 obtains the stop control signal from the precision control unit 22, the first calculating unit 14 calculates values of the objective function for the individuals by the predetermined method with respect to all of a plurality of individuals of the current generation generated by the generating unit 12 in the next and subsequent processing. When the second calculating unit 16 obtains the stop control signal from the precision control unit 22, the second calculating unit 16 stops the approximate calculation for the individuals of the current generation generated in the next and subsequent processing. Thus, the values of the objective function for the plurality of individuals of the current generation are calculated only by the high-precision calculation by the first calculating unit 14.

Figure 8:
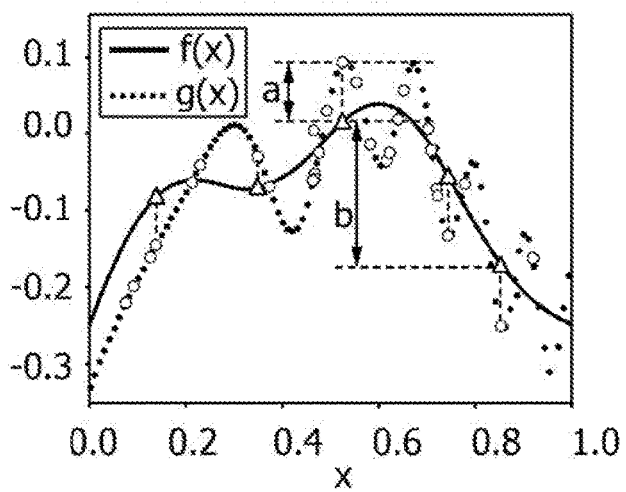
FIG. 8 illustrates an example of calculation results in a case where approximate calculation is applied to evolutionary computation and the precision of the approximate calculation is controlled.
Figure 8:
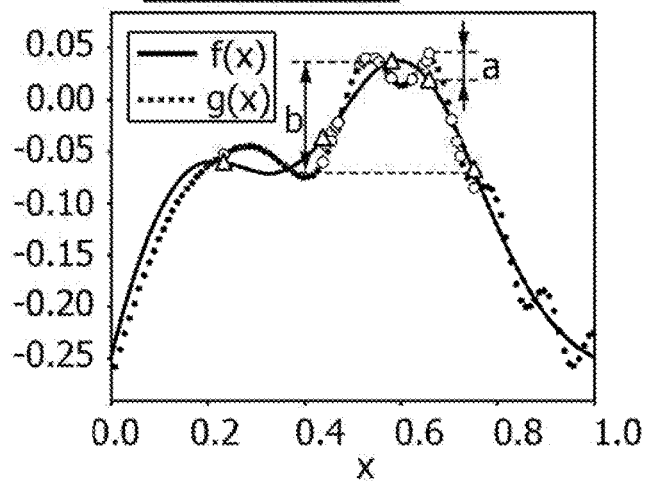
Figure 8:
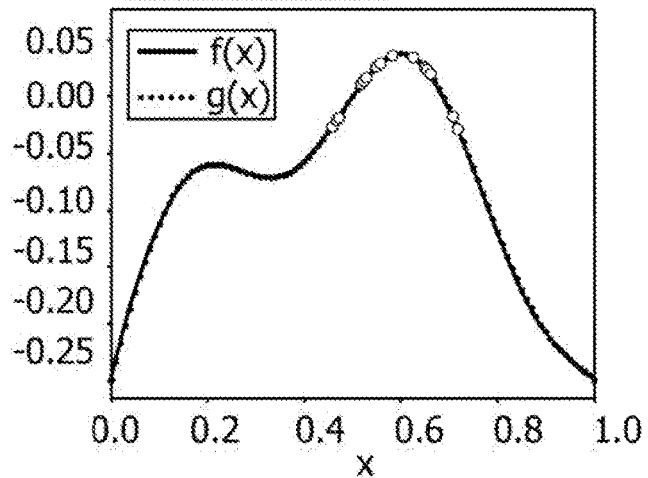

FIG. 8 illustrates an example of calculation results in a case where approximate calculation is applied to evolutionary computation and the precision of the approximate calculation is controlled. The graphs illustrated in FIG. 8 are examples of simulation results in a case where approximate calculation is applied to the evolutionary computation and where the precision of the approximate calculation is controlled.

In the zeroth generation illustrated in FIG. 8, the objective function g(x) acquired by the low-precision calculation by the second calculating unit 16 has a precision difference from the objective function f(x) acquired by the high-precision calculation by the first calculating unit 14. In this case, in order to maintain the relationship (2a≤b) that the value 2a twice as much as the precision difference a is equal to or lower than the fitness difference b, the precision of the approximate calculation by the second calculating unit 16 is controlled so that the precision difference in the fifth generation is reduced. In the sixth and subsequent generations, the precision difference is 0. The high precision calculation by the first calculating unit 14 is only performed without performing the approximate calculation. Because the relationship (2a≤b) that the value 2a twice as much as the precision difference a is equal to or lower than the fitness difference b is maintained, the ranking of the plurality of individuals is properly performed even when the approximate calculation is applied to the evolutionary computation.

Figure 9:
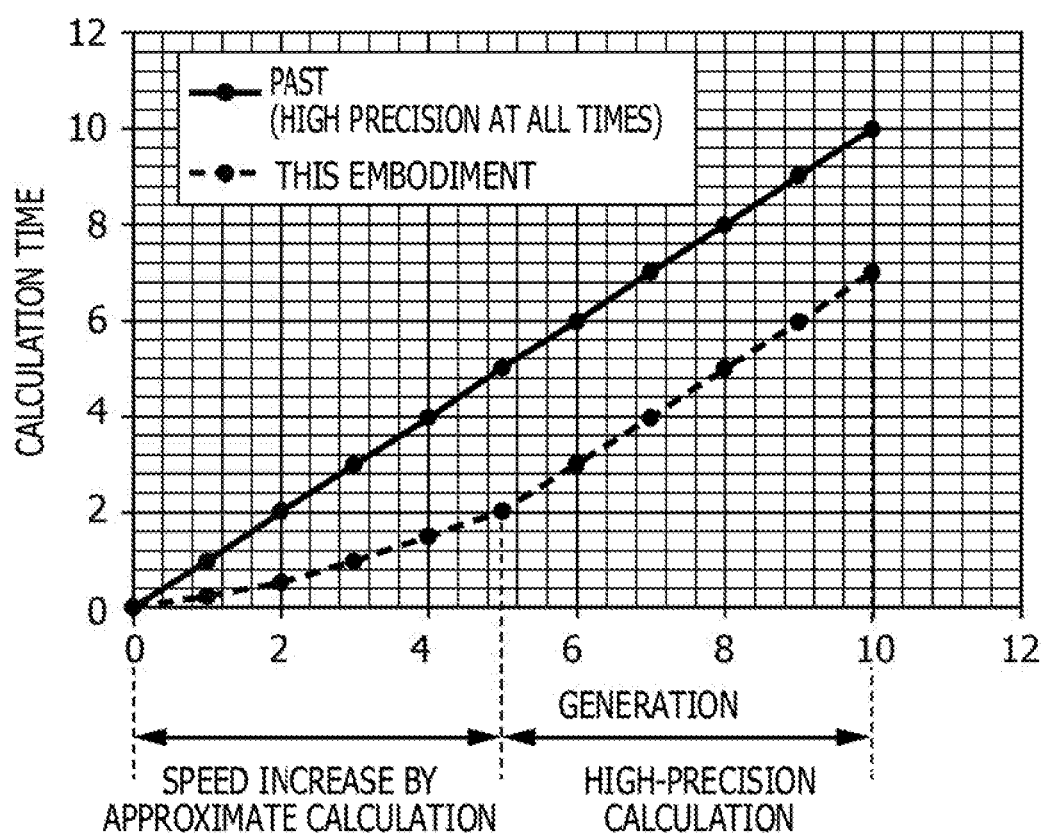
FIG. 9 is an explanatory diagram for explaining calculation times in evolutionary computation in a case where this embodiment is applied.

Next, FIG. 9 illustrates an explanatory diagram for explaining calculation times in evolutionary computation in a case where this embodiment is applied. The solid line in FIG. 9 indicates calculation time of an objective function only by the high-precision calculation, and the broken line indicates calculation time when this embodiment is applied. In the example illustrated in FIG. 9, in a case where approximate calculation is used, the values of the objective function are calculated by performing the approximate calculation by the second calculating unit 16 up to the fifth generation and performing the calculation only by the first calculating unit 14 in the generations subsequent to the fifth generation. Up to the fifth generation, the precision of the approximate calculation by the second calculating unit 16 is properly controlled.

Comparing between the solid line and the broken line illustrated in FIG. 9, the speed of the calculation processing is high because approximate calculation is performed by the second calculating unit 16 up to the fifth generation. In the generations subsequent to the fifth generation, the solid line and the broken line have slopes that are about the same because the high-precision calculation by the first calculating unit 14 is performed. Up to the fifth generation, because approximate calculation by the second calculating unit 16 is performed, the calculation time of the evolutionary computation may be greatly reduced.

Figure 10:
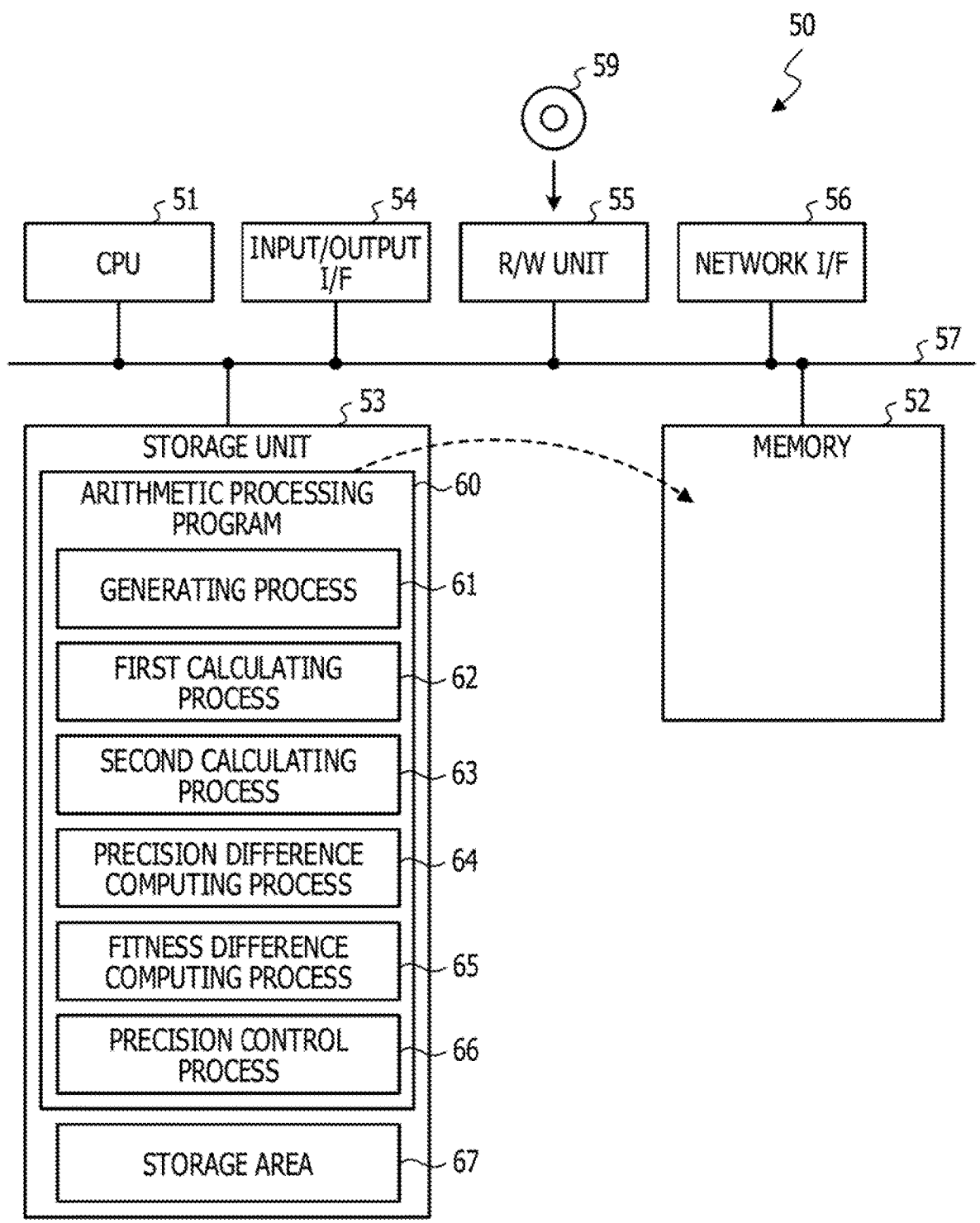
FIG. 10 is a block diagram illustrating a schematic configuration of a computer functioning as an arithmetic processing unit according to an embodiment.

The arithmetic processing unit 10 may be implemented by a computer 50 illustrated in FIG. 10, for example. The computer 50 includes a CPU 51, a memory 52 as a temporary storage area, and a non-volatile storage unit 53. The computer 50 includes an input/output interface (I/F) 54 to which an input/output device is coupled and a read/write (R/W) unit 55 that controls reading and writing data from and to a recording medium 59. The computer 50 includes a network I/F 56 coupled to a network such as the Internet. The CPU 51, the memory 52, the storage unit 53, the input/output I/F 54, the R/W unit 55, and the network I/F 56 are coupled to each other via a bus 57.

The storage unit 53 may be implemented by a hard disk drive (HDD), a solid state drive (SSD), a flash memory, or the like. The storage unit 53 as a storage medium stores an arithmetic processing program 60 for causing the computer 50 to function as the arithmetic processing unit 10. The arithmetic processing program 60 has a generating process 61, a first calculating process 62, a second calculating process 63, a precision difference computing process 64, a fitness difference computing process 65, and a precision control process 66. A storage area 67 stores information configuring the storage unit 15.

The CPU 51 reads the arithmetic processing program 60 from the storage unit 53, expands it in the memory 52, and sequentially executes the processes of the arithmetic processing program 60. The CPU 51 operates as the generating unit 12 illustrated in FIG. 1 by executing the generating process 61. The CPU 51 operates as the first calculating unit 14 illustrated in FIG. 1 by executing the first calculating process 62. The CPU 51 operates as the second calculating unit 16 illustrated in FIG. 1 by executing the second calculating process 63. The CPU 51 operates as the precision difference computing unit 18 illustrated in FIG. 1 by executing the precision difference computing process 64. The CPU 51 operates as the fitness difference computing unit 20 illustrated in FIG. 1 by executing the fitness difference computing process 65. The CPU 51 operates as the precision control unit 22 illustrated in FIG. 1 by executing the precision control process 66. The CPU 51 reads out the information from the storage area 67 and expands it in the storage unit 15 into the memory 52. With this, the computer 50 having executed the arithmetic processing program 60 functions as the arithmetic processing unit 10. The CPU 51 that executes the arithmetic processing program 60 being software is hardware.

The functions implemented by the arithmetic processing program 60 may also be implemented by, for example, a semiconductor integrated circuit, more specifically, an application-specific integrated circuit (ASIC) or the like.

Figure 11:
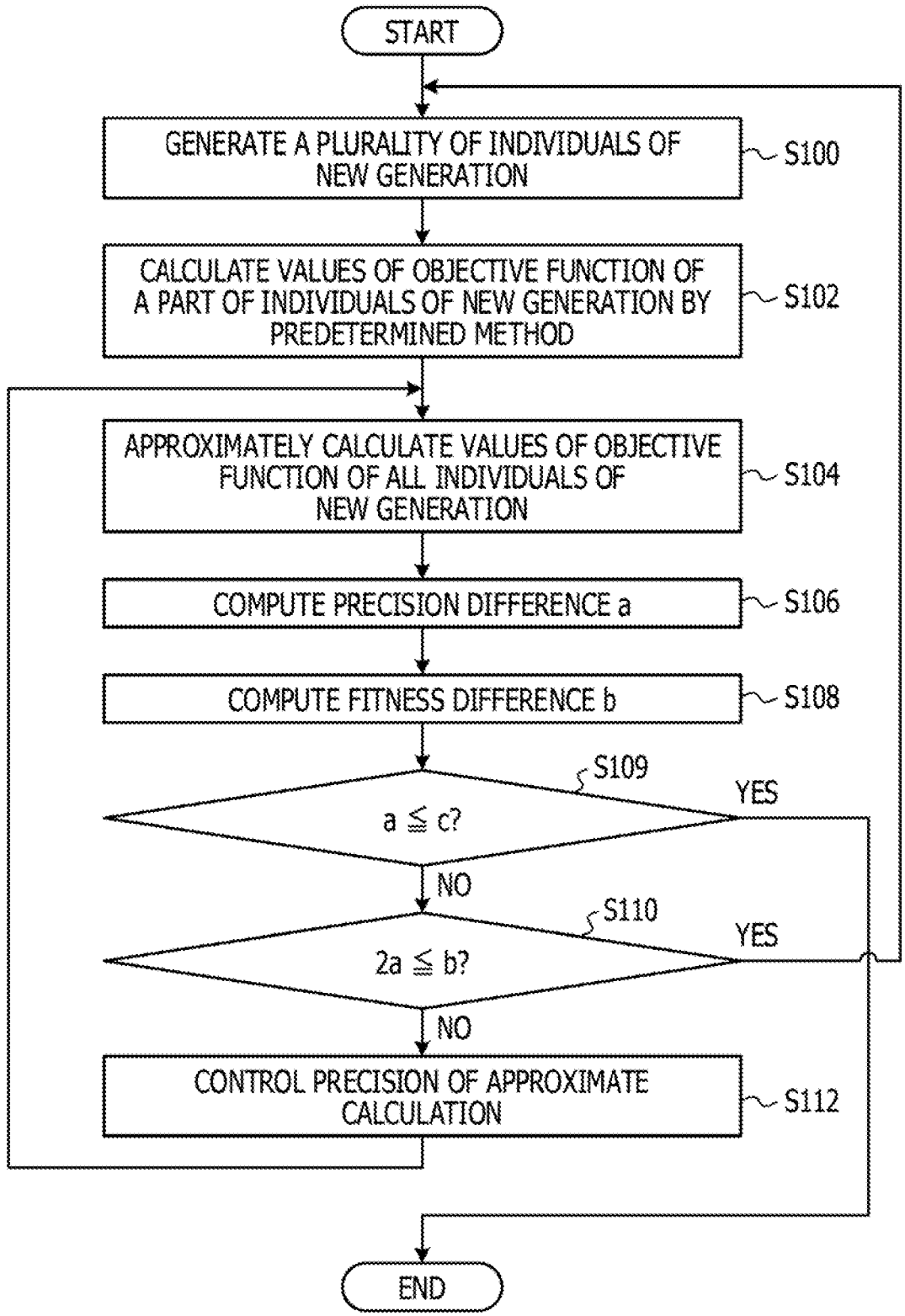
FIG. 11 is a flowchart illustrating an example of an arithmetic processing routine according to the embodiment.

Next, actions of the arithmetic processing unit 10 according to the embodiment will be described. First, with respect to each of a plurality of variables, the first calculating unit 14 in the arithmetic processing unit 10 calculates values of an objective function for the variables and registers them with a plurality of tables in the storage unit 15. When the arithmetic processing unit 10 receives an instruction signal indicating start of evolutionary computation, the arithmetic processing unit 10 executes an arithmetic processing routine illustrated in FIG. 11.

In step S100, the generating unit 12 generates a plurality of individuals of the current generation based on a plurality of individuals of the previous generation generated in step S100 of the previous processing.

In step S102, for each of partial individuals of the plurality of individuals of the current generation generated in step S100, the first calculating unit 14 calculates, with high precision, values of an objective function for the individuals by a predetermined method.

In step S104, the second calculating unit 16 of the first embodiment approximately calculates values of the objective function for all individuals of the current generation generated in step S100 above by acquiring the values of the objective function with reference to the tables stored in the storage unit 15.

In step S106, the precision difference computing unit 18 computes a precision difference a that is a maximum value of differences between the values of the objective function calculated by the predetermined method in step S102 above and values of the objective function approximately calculated in step S104 above.

In step S108, the fitness difference computing unit 20 computes a fitness difference b that is a difference between the maximum value of the values of the objective function for each of partial individuals and a minimum value of the values of the objective function for each of the partial individuals, which are acquired in step S102 above.

In step S109, the precision control unit 22 determines whether the precision difference a is equal to or lower than a preset threshold value c or not. If the precision difference a is equal to or lower than the preset threshold value c, the arithmetic processing routine ends. The precision control unit 22 outputs a stop control signal to stop the approximate calculation to the first calculating unit 14 and the second calculating unit 16, and evolutionary computation using the high-precision calculation only by the first calculating unit 14 is executed. On the other hand, if the precision difference a is not equal to or lower than the preset threshold value c, the processing moves to step S110.

In step S110, the precision control unit 22 determines whether the relationship (2a≤b) that the value 2a twice as much as the precision difference a computed in step S106 above is equal to or lower than the fitness difference b computed in step S108 above is maintained or not. If the relationship that 2a is equal to or lower than the fitness difference b is maintained, the processing moves to step S100. On the other hand, if the relationship that 2a is equal to or lower than the fitness difference b is not maintained, the processing moves to step S112.

In step S112, the precision control unit 22 outputs a control signal to the second calculating unit 16 for improving the precision of the approximate calculation. In the approximate calculation in step S104 of the next processing, the approximate calculation is performed with higher precision than the precision of the approximate calculation in step S104 of this processing. Until the relationship that 2a is equal to or lower than the fitness difference b is obtained, the processing in step S104 above to step S112 above is repeated.

As described above, for each of partial individuals of the plurality of individuals of the current generation, the arithmetic processing unit according to the first embodiment calculates values of objective function for the individuals by a predetermined method. For each of the plurality of individuals of the current generation including the partial individuals having undergone the calculation by the predetermined method, the arithmetic processing unit approximately calculates values of the objective function for the individuals with lower precision than the predetermined method. The arithmetic processing unit computes a precision difference representing a difference between a value of the objective function calculated by the predetermined method and an approximately calculated value of the objective function. The arithmetic processing unit computes a fitness difference representing a difference between values of the objective function based on the values of the objective function for each of a plurality of individuals of the current generation. Based on the precision difference and the fitness difference, the arithmetic processing unit controls the precision of approximate calculation such that as the fitness difference increases, the precision difference increases and as the fitness difference decreases, the precision difference decreases. Thus, when evolutionary computation is applied, proper calculation results may be acquired in a short period of time. More specifically, for example, the calculation time for optimizing the objective function by applying evolutionary computation may be reduced by performing approximate calculation. The ranking of a plurality of individuals is possible when an objective function is optimized by applying evolutionary computation, and a highly precise calculation result may be obtained in a short period of time.

<Arithmetic Processing Unit of Second Embodiment>

Next, a second embodiment will be described. An arithmetic processing unit of the second embodiment is different from that of the first embodiment in that, in a case where values of an objective function are acquired by an iterative calculation method, the arithmetic processing unit of the second embodiment performs approximate calculation by a lower number of iterations than that of the high-precision calculation.

An iterative calculation method may be used for acquiring values of an objective function. For example, in order to acquire a performance value of the main wings of an aircraft, a performance value of the main wings is calculated as a value of the objective function for individuals representing design values relating to the main wings. In this case, in order to acquire a performance value of the main wings from the design values relating the main wings, fluid mechanics calculation is to be performed. When fluid mechanics calculation is performed, iterative calculation using a finite element method, for example, is to be performed.

Accordingly, when values of an objective function are acquired by an iterative calculation method, the second calculating unit 16 of the second embodiment acquires the values of the objective function with a lower number of iterations than the number of iterations by the first calculating unit 14 to approximately calculate the values of the objective function for individuals of the current generation.

In order to control the precision of the approximate calculation, the precision control unit 22 of the second embodiment adjusts the number of iterations used for calculation by the second calculating unit 16 so that the precision of the approximate calculation may be controlled. More specifically, for example, the precision control unit 22 outputs a precision control signal for adjusting the number of iterations to the second calculating unit 16 to control the precision of the approximate calculation by the second calculating unit 16.

Thus, also when an iterative calculation method is used for calculation of values of an objective function, the calculation time for optimizing the objective function by using evolutionary computation may be reduced.

As described above, in a case where values of an objective function are acquired by an iterative calculation method, the arithmetic processing unit of the second embodiment acquires the values of the objective function with a lower number of iterations than the number of iterations by the first calculating unit 14 to approximately calculate values of the objective function for individuals of the current generation. In order to control the precision of the approximate calculation, the arithmetic processing unit controls the precision of the approximate calculation by outputting a precision control signal for adjusting the number of iterations to be used in the calculation by the second calculating unit 16 to the second calculating unit 16. Thus, also when an iterative calculation method is used for calculation of values of an objective function, the calculation time for optimizing the objective function by using evolutionary computation may be reduced.

<Arithmetic Processing Unit of Third Embodiment>

Next, a third embodiment will be described. An arithmetic processing unit of the third embodiment is different from the first and second embodiments in that values of an objective function is approximately calculated by acquiring values of the objective function with a lower number of bits than the number of bits used by the high-precision calculation.

The second calculating unit 16 of the third embodiment approximately calculates values of an objective function for individuals of the current generation by acquiring the values of the objective function by using a numerical value expressed by a lower number of bits than the number of bits used in the calculation by the first calculating unit 14.

For example, the number of bits of a numerical value to be read is 32 bits when the first calculating unit 14 calculates a value of an objective function for an individual. On the other hand, for example, the number of bits of the numerical value to be read is 8 bits for the second calculating unit 16. Thus, the number of bits of a numerical value to be used for approximate calculation by the second calculating unit 16 is ¼ of the number of bits of a numerical value to be used by the high-precision calculation by the first calculating unit 14, and the speed of the calculation processing of the evolutionary computation is increased. The number of bits of a numerical value to be used in the approximate calculation by the second calculating unit 16 is reduced so that the storage area in a data storage unit (not illustrated) that stores calculation results of the approximate calculation may be reduced. Thus, more calculation results may be stored in the data storage unit (not illustrated).

In order to control the precision of the approximate calculation, the precision control unit 22 of the third embodiment adjusts the number of bits to be used for calculation by the second calculating unit 16 so that the precision of the approximate calculation is controlled. More specifically, for example, the precision control unit 22 outputs a precision control signal for adjusting the number of bits of a numerical value to be used in the approximate calculation by the second calculating unit 16 to the second calculating unit 16 to control the precision of the approximate calculation by the second calculating unit 16.

As described above, the arithmetic processing unit of the third embodiment approximately calculates values of an objective function for individuals of the current generation by acquiring the values of the objective function by using a numerical value expressed by a lower number of bits than the number of bits used in the calculation by the first calculating unit 14. In order to control the precision of the approximate calculation, the arithmetic processing unit adjusts the number of bits to be used in the approximate calculation by the second calculating unit 16 so that the precision of the approximate calculation is controlled. Thus, the calculation time for optimizing the objective function by applying the evolutionary computation may be reduced, and the storage area for storing calculation results may be reduced.

<Arithmetic Processing Unit of Fourth Embodiment>

Next, a fourth embodiment will be described. An arithmetic processing unit of the fourth embodiment is different from the first to third embodiments in that values of an objective function are approximately calculated by acquiring the values of the objective function for values of individuals by using a trained model for acquiring values of the objective function from values of individuals.

Figure 12:
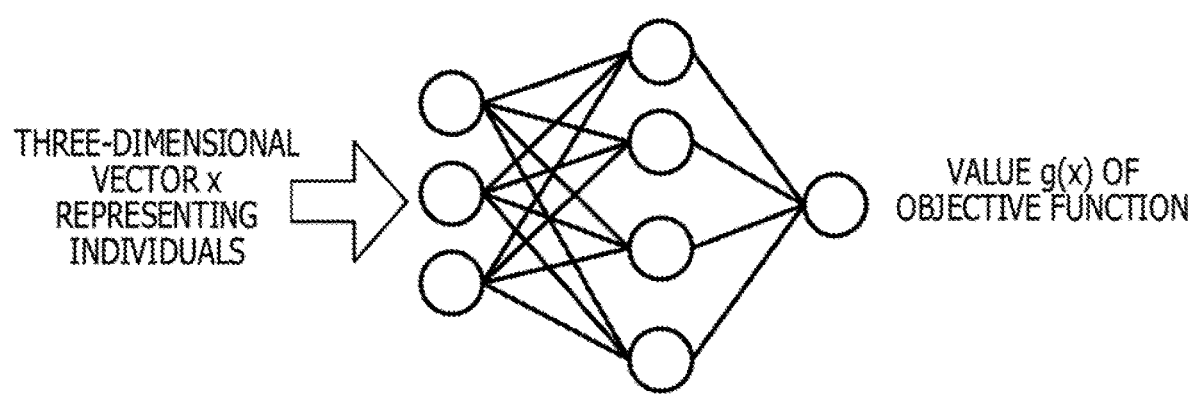
FIG. 12 illustrates an example of a trained model to be used in a fourth embodiment.

According to the fourth embodiment, a neural network as illustrated in FIG. 12 is used as the trained model for acquiring values of an objective function from values of individuals. The storage unit 15 of the fourth embodiment stores a trained model for acquiring values of an objective function from values of individuals.

The trained model of this embodiment outputs values of an objective function from values of individuals. The example of the trained model illustrated in FIG. 12 is an example of a trained model in which a value of an individual is represented by a three-dimensional vector and a value of an objective function is represented by a scalar value.

The trained model of this embodiment has learned, in advance, calculation results of the high-precision calculations acquired by the first calculating unit 14 as learning data. In order to cause the trained model to learn, an existing learning algorithm is used. Herein, the learning data may be referred to as "machine learning data", "machine-learning data", "training data", and the like. Moreover, the learning may be referred to as "machine learning", "machine-learning", "machine learning processing", and the like. For example, the learning algorithm may be referred to as "machine-learning algorithm".

More specifically, for example, because data representing combinations of values of individuals and values of an objective function for the individuals are acquired by the high-precision calculations by the first calculating unit 14, the data are set as the learning data in this embodiment.

In order to control the precision of the approximate calculation, the precision control unit 22 of the fourth embodiment increases the number of learning data pieces used for machine learning by the trained model, which is to be used for the approximate calculation by the second calculating unit 16, so that the precision of the approximate calculation is controlled. More specifically, for example, the precision control unit 22 outputs a precision control signal for increasing the number of learning data pieces to the second calculating unit 16 to control the precision of the approximate calculation by the second calculating unit 16.

When the second calculating unit 16 of the fourth embodiment obtains the precision control signal from the precision control unit 22, the second calculating unit 16 causes the trained model to re-learn by using the learning data acquired by the high-precision calculation by the first calculating unit 14. By causing the trained model to re-learn, a trained model is acquired that outputs a value of the objective function with higher precision.

When the number of calculations of the high-precision calculations by the first calculating unit 14 is increased, more learning data pieces may be acquired. Thus, by causing the trained model to re-learn by using the learning data pieces, the precision of values of the objective function output from the trained model is enhanced. The calculation results of the high-precision calculations are reflected on the trained model.

The second calculating unit 16 approximately calculates values of the objective function from values of individuals by using the trained model having re-learned. Thus, approximate calculation with higher precision than the approximate calculation in the last processing is performed.

As described above, the arithmetic processing unit according to the fourth embodiment approximately calculates values of an objective function for individuals of the current generation by acquiring the values of the objective function for values of individuals by using a trained model for acquiring values of the objective function from values of individuals. In order to control the precision of the approximate calculation, the arithmetic processing unit adjusts the number of learning data pieces used for learning by the trained model, which are to be used for the approximate calculation by the second calculating unit 16, so that the precision of the approximate calculation is controlled. Thus, the calculation time for optimizing the objective function by applying the evolutionary computation may be reduced by using the trained model reflecting calculation results of the high-precision calculations.

In the above description, the program is stored (installed) in the storage unit in advance. However, embodiments are not limited thereto. The program relating to the disclosed art may be provided by being recorded in a recording medium such as a compact disc read-only memory (CD-ROM), a digital versatile disc (DVD)-ROM, and a Universal Serial Bus (USB) memory.

All documents, patent applications and technological standards described herein are incorporated herein by reference to the same extent as the case where each of the documents, patent applications and technological standards is specifically and individually written as being incorporated by reference.

Next, variation examples of the embodiments will be described.

Having described, as an example, a case where the second calculating unit 16 of the first embodiment approximately calculates a value of an objective function for an individual of the current generation by interpolation of values stored in a table in the storage unit 15, embodiments are not limited thereto. For example, the second calculating unit 16 of the first embodiment may use a value of an objective function corresponding to the closest value to the value of the individual of the current generation. More specifically, for example, when an individual x=(v', w') of the current generation is generated and when the element V is the closest to $v_2$ illustrated in FIG. 5 and the element w is the closest to $w_1$ illustrated in FIG. 5, the second calculating unit 16 may acquire $f(x)=f_{12}$. The second calculating unit 16 of the first embodiment may perform approximate calculation by using the method disclosed in Japanese Laid-open Patent Publication No. 2001-109732.

Having described the case where, according to the fourth embodiment, the precision of approximate calculation is controlled by increasing the number of learning data pieces and causing the trained model to re-learn by using the learning data pieces, embodiments are not limited thereto. For example, the precision of approximate calculation may be controlled by increasing the number of parameters of the trained model. In this case, the number of parameters is increased by increasing the number of layers of the neural network or the number of neurons, for example, so that approximate calculation with higher precision may be performed. When the number of parameters is increased, the trained model is to re-learn by using the learning data.

Having described, as an example, the case where the fitness difference computing unit 20 computes a fitness difference b based on calculation results of high-precision calculation by the first calculating unit 14, embodiments are not limited thereto. The fitness difference computing unit 20 may compute the fitness difference b based on calculation results of approximate calculation by the second calculating unit 16.

Having described, as an example, the case where the precision control unit 22 of the embodiments controls the precision of approximate calculation by the second calculating unit 16 such that the relationship (2a≤b) that the value 2a twice as much as the precision difference a is equal to or lower than the fitness difference b is maintained, embodiments are not limited thereto. The precision of approximate calculation may be controlled in any manner if the precision of approximate calculation is controlled such that as the fitness difference b increases, the precision difference a increases and as the fitness difference b decreases, the precision difference a decreases. For example, the precision control unit 22 may control the precision of approximate calculation by the second calculating unit 16 such that a relationship (a≤b) that the precision difference a is equal to or lower than the fitness difference b is maintained. The precision control unit 22 may control the precision of approximate calculation by the second calculating unit 16 such that a relationship that a difference between the precision difference a and the fitness difference b is equal to or lower than a preset threshold value is maintained.

Having described, as an example, the case where one second calculating unit 16 is provided according to the embodiments, embodiments are not limited thereto. For example, the arithmetic processing unit 10 may include a plurality of second calculating units 16, and approximate calculations may be divided among the plurality of second calculating units 16.

Having described, as an example, the case where, for each generation, the precision of approximate calculation is controlled such that as the fitness difference b increases, the precision difference a increases and as the fitness difference b decreases, the precision difference a decreases, embodiments are not limited thereto. For example, only for a preset generation (such as the fifth generation and the tenth generation), the precision of approximate calculation may be controlled such that as the fitness difference b increases, the precision difference a increases and as the fitness difference b decreases, the precision difference a decreases.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus of optimizing an objective function by applying an evolutionary computation, the arithmetic processing apparatus comprising:
    a memory; and
    a processor circuitry coupled to the memory, the processor circuitry being configured to
        execute a generating processing that includes generating, in the processor circuitry, a current generation set of individuals by performing evolutionary computation on a previous generation of the individuals, each of the individuals corresponding to a candidate solution representing variables of the objective function,
        execute a first calculating processing that includes calculating, in the processor circuitry, for each of partial individuals among the individuals included in the current generation set generated by the generating processing, a first value of the objective function by a first method,
        execute a second calculating processing that includes obtaining a second value being a value of the objective function by performing in the processor circuitry an approximate calculation to approximately calculate, for each of the individuals included in the current generation set generated by the generating processing, a second value of the objective function by a second method that is a method with lower precision than the first method,
        execute a fitness difference computing processing that includes computing, in the processor circuitry, a fitness difference representing a difference between a first representative value and a second representative value, the first representative value being a value that is the largest value among a plurality of first values obtained by the calculating of the first value for each of the partial individuals through the first method, the second representative value being a value that is the smallest value among a plurality of second values obtained by the calculating of the second value for each of the individuals through the second method, and
        execute a precision control processing that includes controlling, in the processor circuitry, based on the fitness difference a precision of the approximate calculation to be performed by the second calculating processing, the controlling of the precision of the approximate calculation including adjusting, in accordance with the fitness difference, the precision of the approximate calculation to be performed in the second calculation processing such that as the fitness difference increases, the precision of the approximate calculation decreases and as the fitness difference decreases, the precision of the approximate calculation increase, and causing the processor circuitry to execute the second calculating processing using the adjusted precision of the second calculation processing.

2. The arithmetic processing apparatus according to claim 1, wherein the processor is further configured to execute a precision difference computing processing that includes computing a precision difference representing a difference between the first value and the second value.

3. The arithmetic processing apparatus according to claim 2, wherein the precision control processing is configured to control the precision of the approximate calculation such that a relationship that the precision difference is equal to or lower than the fitness difference is maintained and that as the fitness difference increases, the precision difference increases and as the fitness difference decreases, the precision difference decreases.

4. The arithmetic processing apparatus according to claim 2, wherein the precision control processing is configured to control the precision of the approximate calculation such that a relationship that a value twice as much as the precision difference is equal to or lower than the fitness difference is maintained and that as the fitness difference increases, the precision difference increases and as the fitness difference decreases, the precision difference decreases.

5. The arithmetic processing apparatus according to claim 2,
wherein the precision difference computing processing is configured to compute, as the precision difference, a maximum value of differences between values of the objective function calculated by the predetermined method by the first calculating processing and values of the objective function approximately calculated by the second calculating processing, and
wherein the fitness difference computing processing is configured to compute, as the fitness difference, a difference between the maximum value of the values of the objective function for each of the plurality of individuals of a current generation and a minimum value of the values of the objective function for each of the plurality of individuals of the current generation.

6. The arithmetic processing apparatus according to claim 1, wherein the second calculating processing is configured to approximately calculate values of the objective function for the individuals of the current generation by acquiring a value of the objective function with reference to a table in which values of the individuals and values of the objective function corresponding to the values of the individuals are associated in advance.

7. The arithmetic processing apparatus according to claim 1, wherein,
when values of the objective function are acquired by an iterative calculation method, the second calculating processing approximately calculates values of the objective function for individuals of the current generation by acquiring the values of the objective function with a lower number of iterations than the number of iterations by the first method by the first calculating processing, and
the precision control processing controls the precision of the approximate calculation by adjusting the number of iterations to be used for the approximate calculation by the second calculating processing.

8. The arithmetic processing apparatus according to claim 1, wherein
the second calculating processing is configured to approximately calculate values of an objective function for individuals of the current generation by acquiring the values of the objective function by using a numerical value expressed by a lower number of bits than the number of bits used in the calculation by the first method by the first calculating processing, and
the precision control processing is configured to control the precision of the approximate calculation by adjusting the number of bits to be used for the approximate calculation by the second calculating processing.

9. The arithmetic processing apparatus according to claim 1, wherein
the second calculating processing is configured to approximately calculate values of the objective function for the individuals of the current generation by acquiring the values of the objective function for the values of the individuals by using a trained model for acquiring a value of the objective function from the values of the individuals, and
the precision control processing is configured to control the precision of the approximate calculation by adjusting the number of parameters in the trained model or the number of training data pieces used for machine-learning by the trained model, which is to be used for the approximate calculation by the second calculating processing.

10. The arithmetic processing apparatus according to claim 1, wherein the precision control processing is configured to control the precision of the approximate calculation by the second calculating processing for each generation.

11. The arithmetic processing unit according to claim 1, wherein the precision control processing is configured to controls to change the precision every time the individuals of the current generation are iteratively generated, and the approximate calculation is performed with the changed precision.

12. A non-transitory computer-readable storage medium for storing an arithmetic processing program of optimizing an objective function by applying an evolutionary computation, the arithmetic processing program comprising instructions for causing a processor circuitry to perform processing, the processing comprising:
executing a generating processing that includes generating, in the processor circuitry, a current generation set of individuals by performing evolutionary computation on a previous generation of the individuals, each of the individuals corresponding to a candidate solution representing variables of the objective function;
executing a first calculating processing that includes calculating, in the processor circuitry, for each of partial individuals among the individuals included in the current generation set generated by the generating processing, a first value of the objective function by a first method;
executing a second calculating processing that includes obtaining a second value being a value of the objective function by performing in the processor circuitry an approximate calculation to approximately calculate, for each of the individuals included in the current generation set generated by the generating processing, a second value of the objective function by a second method that is a method with lower precision than the first method;
executing a fitness difference computing processing that includes computing, in the processor circuitry, a fitness difference representing a difference a first representative value and a second representative value, the first representative value being a value that is the largest value among a plurality of first values obtained by the calculating of the first value for each of the partial individuals through the first method, the second representative value being a value that is the smallest value among a plurality of second values obtained by the calculating of the second value for each of the individuals through the second method; and
executing a precision control processing that includes controlling, in the processor circuitry, based on the fitness difference a precision of the approximate calculation to be performed by the second calculating processing, the controlling of the precision of the approximate calculation including adjusting, in accordance with the fitness difference, the precision of the approximate calculation to be performed in the second calculation processing such that as the fitness difference increases, the precision of the approximate calculation decreases and as the fitness difference decreases, the precision of the approximate calculation increase, and causing the processor circuitry to execute the second calculating processing using the adjusted precision of the second calculation processing.

13. A computer-implemented method of optimizing an objective function by applying an evolutionary computation, the method comprising:
- executing a generating processing that includes generating, in a processor circuitry of the computer, a current generation set of individuals by performing evolutionary computation on a previous generation of the individuals, each of the individuals corresponding to a candidate solution representing variables of the objective function;
- executing a first calculating processing that includes calculating, in the processor circuitry, for each of partial individuals among the individuals included in the current generation set generated by the generating processing, a first value of the objective function by a first method;
- executing a second calculating processing that includes obtaining a second value being a value of the objective function by performing in the processor circuitry an approximate calculation to approximately calculate, for each of the individuals included in the current generation set generated by the generating processing, a second value of the objective function by a second method that is a method with lower precision than the first method;
- executing a fitness difference computing processing that includes computing, in the processor circuitry, a fitness difference representing a difference between a first representative value and a second representative value, the first representative value being a value that is the largest value among a plurality of first values obtained by the calculating of the first value for each of the partial individuals through the first method, the second representative value being a value that is the smallest value among a plurality of second values obtained by the calculating of the second value for each of the individuals through the second method; and
- executing a precision control processing that includes controlling, in the processor circuitry, based on the fitness difference a precision of the approximate calculation to be performed by the second calculating processing, the controlling of the precision of the approximate calculation including adjusting, in accordance with the fitness difference, the precision of the approximate calculation to be performed in the second calculation processing such that as the fitness difference increases, the precision of the approximate calculation decreases and as the fitness difference decreases, the precision of the approximate calculation increase, and causing the processor circuitry to execute the second calculating processing using the adjusted precision of the second calculation processing.

* * * * *